United States Patent [19]

Yamamoto

[11] Patent Number: 5,401,106
[45] Date of Patent: Mar. 28, 1995

[54] BEARING ASSEMBLY WITH INNER RACE BEARING SUPPORT MEANS

[75] Inventor: Kozo Yamamoto, Neyagawa, Japan

[73] Assignee: Kabushiki Kaisha Daikin Seisakusho, Osaka, Japan

[21] Appl. No.: 18,708

[22] Filed: Feb. 17, 1993

[30] Foreign Application Priority Data

Feb. 17, 1992 [JP] Japan .................................. 4-029319

[51] Int. Cl.6 .................................................. F16C 33/78
[52] U.S. Cl. ..................................... 384/477; 384/484
[58] Field of Search ................ 384/477, 484; 277/152, 277/184, 227

[56] References Cited

U.S. PATENT DOCUMENTS

| | | |
|---|---|---|
| 2,712,460 | 7/1955 | Saywell . |
| 2,764,433 | 9/1956 | Cobb . |
| 3,268,984 | 8/1966 | Kupchick ..................... 384/484 X |
| 4,054,334 | 10/1977 | McAllister .......................... 384/484 |
| 4,398,775 | 8/1983 | Hofmann et al. ................... 384/484 |
| 4,533,265 | 8/1985 | Woodbridge .................. 384/484 X |
| 4,632,404 | 12/1986 | Feldle et al. .................... 277/184 X |
| 5,232,292 | 8/1993 | Stackling et al. ............. 384/477 X |

FOREIGN PATENT DOCUMENTS

| | | | |
|---|---|---|---|
| 1281749 | 12/1961 | France ................................. 384/477 |
| 4060216 | 2/1992 | Japan .................................. 384/477 |
| 2174767 | 11/1986 | United Kingdom ................ 384/477 |

*Primary Examiner*—John J. Calvert
*Attorney, Agent, or Firm*—Knobbe, Martens, Olson & Bear

[57] ABSTRACT

The invention includes a bearing assembly having concentric inner and outer races and roller elements disposed therebetween. Seal members are disposed on either side of the races, flanking the roller elements. The outer race is provided with circumferential grooves adjacent to each axial face of the outer race. Annular urging members are fitted between the races, adjoining the seal members on the outer sides thereof, urging the seals into contact with the races. The outer circumferential edge of each urging member extends into one of the grooves in the outer race. The urging members are biased such that the inner circumferential edge of each engages the adjacent seal and retains the inner race within the outer race in order to reduce wobble and vibration between the inner and outer races.

5 Claims, 2 Drawing Sheets

BEARING ASSEMBLY WITH INNER RACE BEARING SUPPORT MEANS

CROSS-REFERENCE TO RELATED APPLICATION

This application is related to copending application Ser. No. 964,506, filed Oct. 21, 1992, commonly assigned with the present invention.

BACKGROUND OF THE INVENTION

The present invention relates to a bearing, particularly to a bearing embodying concentric inner and outer races. The present invention also relates to a flywheel assembly including the bearing.

Compound flywheel assemblies for automobile engines are in current use. Such flywheel assemblies typically comprise first and second flywheels, with a viscous damping mechanism disposed between them.

The first flywheel of the flywheel assembly is connected to an engine crankshaft, and a clutch is mounted onto the second flywheel. A bearing is press-fitted onto the hub of the first flywheel. The second flywheel is rotatably supported on the first flywheel through the bearing.

Seal plates are attached to the second flywheel flanking the bearing axially, in order to prevent grease from the viscous damper from leaking out of the assembly, and as an insulator against heat transmission from the clutch. The seal plates are urged against the bearing by disc springs to secure the seal against grease leakage, and further to restrain the bearing body against axial wobbling, such that the second flywheel is checked from deviating with respect to its axis.

Torque transmitted to the first flywheel is transmitted to the second flywheel through the viscous damping mechanism. Torque is in turn transmitted from the second flywheel to a transmission-directed member through the clutch.

The bearing thus employed in the flywheel assembly requires seal plates and disc springs as separate components for maintaining the bearing seal, and to restrain against wobbling deviation therein. Accordingly, these elements must be installed additionally into the flywheel assembly, inconveniencing the bearing installment procedure.

SUMMARY OF THE INVENTION

It is an object of the present invention to facilitate installation of a bearing of the foregoing type into associated apparatus.

It is another object of the present invention to prevent excessive wear of such a bearing installed in a flywheel assembly.

A bearing according to an aspect of the present invention comprises a bearing body including an inner race concentrically within an outer race containing rolling elements between them, as well as seal members and urging members. The seal members are fitted between the inner race and the outer race. The urging members are also fitted between the inner and outer races adjoining outer sides of the seal members, and therein urge the seal members toward one another.

Accordingly, the bearing itself is internally sealed, and it is restrained against wobbling. Thus, separate, external members for sealing and checking wobble are not required. This allows the bearing to be installed into associated apparatus more easily.

A flywheel assembly according to another aspect of the present invention comprises a first flywheel connectable to an engine output member, a second flywheel onto which a clutch can be mounted, a bearing through which the first flywheel rotatably supports the second flywheel, and a damping unit. The damping unit incorporates a viscous damping mechanism for damping torsional vibrations through fluid viscous resistance. The bearing is composed as above, and accordingly is restrained against wobbling, which in turn prevents the second flywheel, which is supported through the bearing, from wobbling axially. Excess wear on the bearing is thus prevented.

The foregoing and other objects and advantages of the present invention will become more apparent from the following detailed description, with reference to the accompanying drawings.

DESCRIPTION OF THE PREFERRED EMBODIMENT

Figure 1:
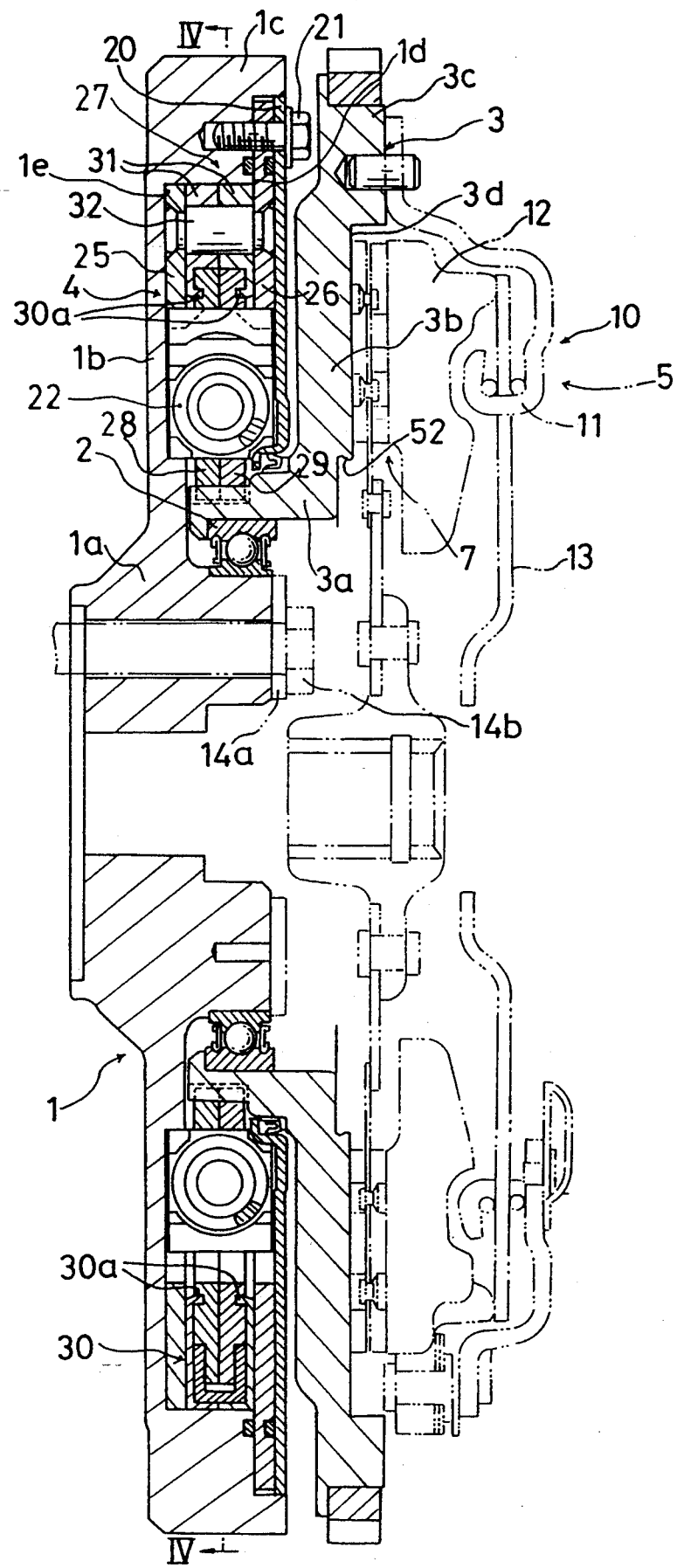
FIG. 1 is a sectional view of a flywheel assembly according to a preferred embodiment of the invention.

FIG. 1 shows a flywheel assembly in an embodiment according to the present invention.

This flywheel assembly comprises a first flywheel 1, a second flywheel 3 rotatably supported by the first flywheel 1 through a bearing 2, and a damping unit 4 disposed between the first flywheel 1 and the second flywheel 3. The first flywheel 1 is fixed to the crankshaft (not shown) of a motor vehicle engine. A clutch 5 is mountable on the second flywheel 3.

The first flywheel 1 is a composite disc formed by a central hub 1a fixed to the crankshaft by bolts 14b, a collar portion 1b integral with the hub 1a and extending radially outward, and a flywheel portion 1c integrally formed as a rim around the periphery of the collar portion 1b and axially protruding toward the second flywheel 3. The hub 1a extends into the second flywheel 3 and rotatably supports it through the bearing 2 disposed thereon.

The second flywheel 3 is a composite disc formed by a central hub 3a, a pressured portion 3b integral with the hub 3a and extending radially, and a clutch mounting portion 3c integral with the circumferential periphery of the pressured portion 3b. The hub 3a extends toward the first flywheel 1 and its inner surface is supported on the bearing 2. The surface of the pressured portion 3b on the clutch-ward side is a friction facing 3d onto which the friction material of a clutch disc 7 presses. The friction facing 3d extends axially beyond the adjacent end face of the hub 3a, wherein the radially inner surface of this extension forms a receiving portion 52 circumferentially recessed. This receiving portion 52 captures grease escaping, under centrifugal force during operation, radially outward along the surface of the second flywheel 3 adjacent the clutch disc 7.

A clutch cover assembly 10 constituting the clutch 5 is mounted onto a corresponding face of the clutch mounting portion 3c. The clutch cover assembly 10 is composed of a clutch cover 11, a pressure plate 12 and a diaphragm spring 13.

Figure 2:
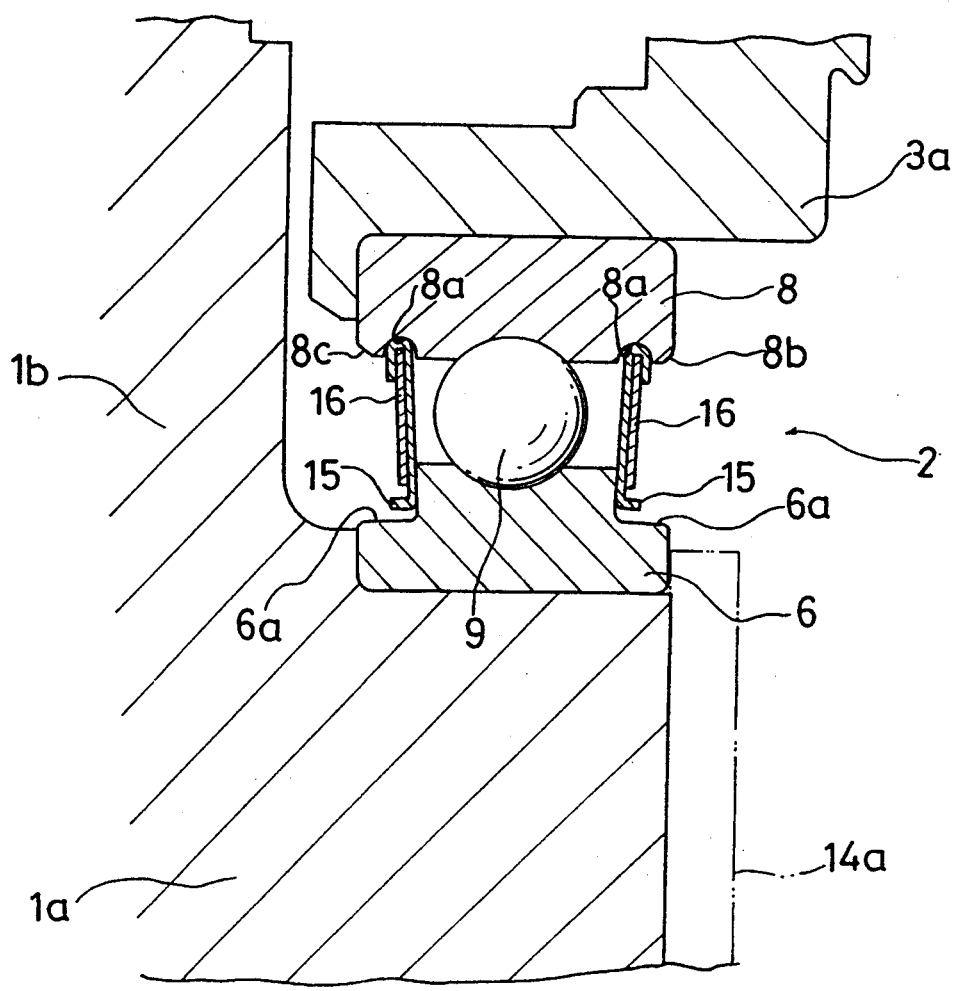
FIG. 2 is an enlarged partial view of FIG. 1.

The bearing 2 comprises, as apparent in FIG. 2, an inner race 6 press-fitted onto the hub 1a; an outer race 8 press-fitted into the hub 3a; balls 9 contained tracked between the inner race 6 and the outer race 8; and disc-like seal members 15 and cone springs 16. The seal members 15 and the cone springs 16 are attached between the inner race 6 and the outer race 8 flanking the balls 9.

The inner race 6 is retained to the hub 1a through a lock plate 14a and bolts 14b (FIG. 1). The inner race 6 is recessed with circumferential grooves 6a at its radially outward corners. The outer race 8 is grooved with circumferential channels 8a along its inner surface near its axial ends. The radially inward corners of the outer race 8 are respective chamfers 8b and 8c. Chamfer 8c toward the collar portion 1b is wider than chamfer 8b on the clutch 5 side of the race. The chamfers 8b and 8c permit the seal members 15 and the cone springs 16 to be easily installed into the races 6 and 8. Further, fluid leaking from the damming unit 4 and moving toward the bearing 2 during operation passes readily along the chamfer 8c to be returned.

Figure 3:
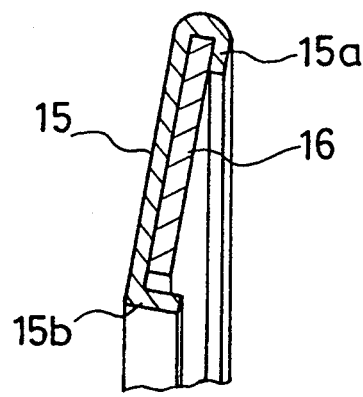
FIG. 3 is a partial perspective view in cross-section of a detail from FIG. 2.

The seal members 15 are made, for example, of resin. FIG. 3 illustrates that the radially outer edge of each seal member 15 is folded radially inward into an overlapping lip 15a, which is inserted into one of the circumferential channels 8a of the outer race 8. The radially inward margins of the seal members 15 are thus located in the circumferential grooves 6a, compelled to abut against the inner race 6. Adjoining each seal member 16 on its axially outer side is a corresponding cone spring 16. The outer rim of each cone spring 16 is inserted into lip 15a of a seal member 15, wherein the cone springs 16 grasp the inner race 6, their rims retained in pivoting opposition within outer race 8 through the seal members 15. Consequently, the bearing 2 is restrained against axial wobble, preventing the second flywheel 3 from wobbling axially. The cone spring 16 forces the lip 15a of the seal member 15 into pressured contact with the circumferential channel 8a, and thereby improves the sealing of the bearing 2.

As described in the foregoing, the seal members 15 and the cone springs 16 are included as a unit in the bearing body composed by the inner race 6 and the outer race 8 containing the balls 9; thus installation of the bearing 2 in between the first flywheel 1 and the second flywheel 3 is greatly facilitated.

Next, the damping unit 4 will be explained briefly. The damping unit 4 includes a pair of drive plates 25 and 26, a viscous damper 27 disposed between them, and a pair of driven plates 28 and 29 in elastic connection with the pair of the drive plates 25 and 26 through the viscous damper 27.

The outside diameter of the drive plate 26 located adjacent the second flywheel 3 is larger than that of the drive plate 25, and is accommodated into a recess 1d of corresponding diameter, formed in the flywheel rim portion 1c of the first flywheel 1. The other drive plate 25 and the viscous damper 27 are fitted into a shorter-diameter recess 1e of the flywheel assembly 1. The damping unit 4 is thus installed into the first flywheel 1, and is retained by a seal plate 20 and bolts 21. The radially inward margins of the driven plates 28 and 29 are connected to the hub 3a of the second flywheel 3, engaged along the crown.

The viscous damping mechanism 27 includes an annular fluid housing 30 disposed around the periphery of the driven plates 28 and 29. The fluid housing 30 has a plurality of tabs 31 circumferentially spaced apart from one another at fixed intervals. Each tab 31 has a hole through which a pin 32 penetrates. The pins 32 tighten the fluid housing 30 between the drive plates 25 and 26. Along the radially inward portion of the fluid housing 30 are an opposed pair of interior rims 30a, which fit into annular grooves formed in the driven plates 18, 19 in order to seal a fluid chamber defined by the fluid housing 30. A plurality of torsion springs 22 are disposed radially inward of the fluid housing 30, for elastically connecting the drive plates 25 and 26 to the driven plates 28 and 29.

Description will now be made of the operation of the flywheel assembly 1.

When torsional vibration is transmitted during operation, the first flywheel 1 and the drive plates 25 and 26 are twisted clockwise or counterclockwise relative to the driven plates 28 and 29. Viscous resistance according to the torsional angle is generated due to the flow of fluid in the viscous damping mechanism 27, such that torsional vibration during operation is damped.

In such an instance, axial wobbling of the second flywheel 3 is checked, since the bearing 2 is restrained against axial wobbling. The bearing 2 is thus not subject to excessive wear, improving its durability.

In the foregoing embodiment, the bearing is disposed between the first and second flywheels of a flywheel assembly. The bearing according to the present invention can be employed in a support application for other rotation members.

Various details of the invention may be changed without departing from its spirit nor its scope. Furthermore, the foregoing description of the embodiment according to the present invention is provided for the purpose of illustration only, and not for the purpose of limiting the invention as defined by the appended claims and their equivalents.

What is claimed is:

1. A bearing comprising:
   an annular outer race having axial faces and first and second circumferential grooves formed adjacent to each axial face thereof;
   an inner race disposed concentrically within said first race, formed with first and second axial surfaces;
   roller elements disposed between said races;
   first and second seal members disposed on opposite sides of said races, said first seal member extending from said first groove to said first axial surface, said second seal member extending from said second groove to said second axial surface;
   first and second urging members disposed on opposite sides of said races, said first urging member extending from said first groove to said first axial surface, said second seal member extending from said second groove to said second axial surface, said urging members biased to urge said seal members against said axial surfaces, respectively, and said urging members biased to retain said inner race generally concentric within said outer race and reduce wobble and vibration therebetween.

2. A bearing according to claim 1, wherein said inner race further comprises circumferential grooves formed on each of said axial surfaces and said seal members engage said circumferential grooves.

3. A bearing according to claim 1 wherein said seal members are formed of a resin material.

4. A bearing according to claim 1, wherein said circumferential grooves of said inner race are distally open; and radially inner corners of said outer race are chamfered.

5. A bearing according to claim 1, wherein said seal member has a disc shape formed of resin, a radially outer edge of each seal being folded radially inward into an overlapping lip; and each of said urging members being a conical spring an outer rim being fitted into said folded lip of a corresponding one of said seal members.

* * * * *